Aug. 25, 1942.   J. L. ANDERSON ET AL   2,293,879
TORCH SUPPORTING AND ADJUSTING APPARATUS
Filed Oct. 31, 1941
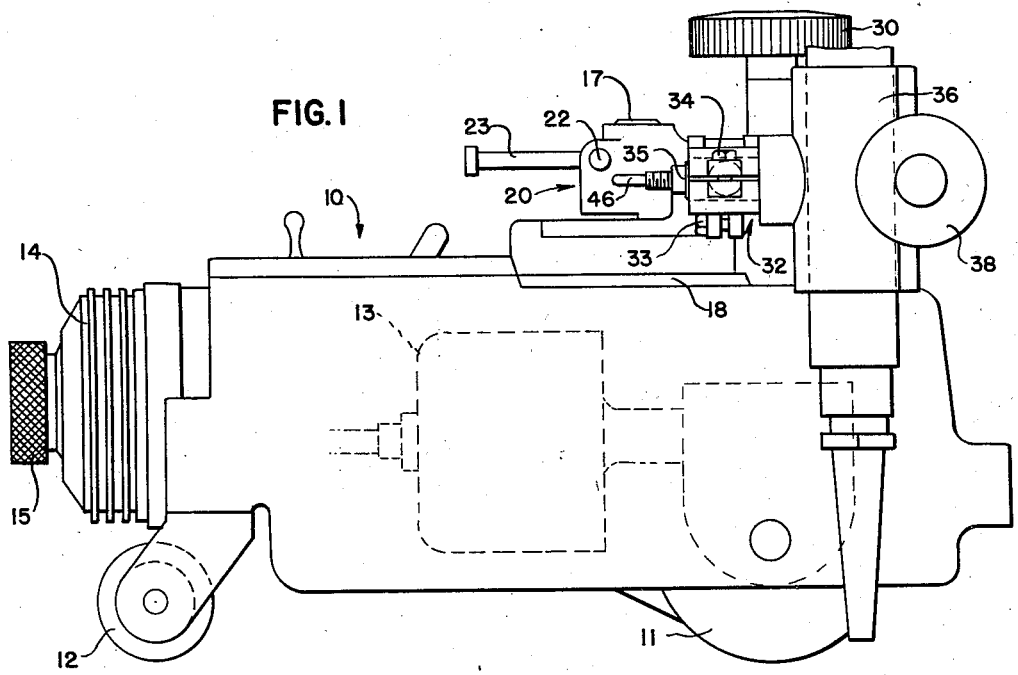
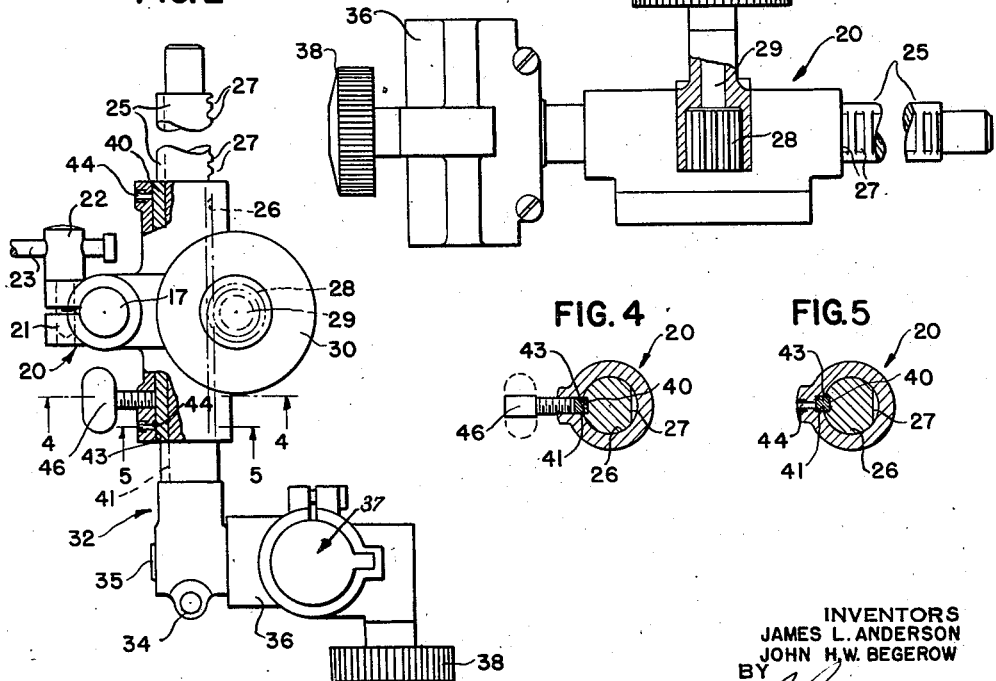
INVENTORS
JAMES L. ANDERSON
JOHN H.W. BEGEROW
BY
ATTORNEY Patented Aug. 25, 1942

2,293,879

UNITED STATES PATENT OFFICE 2,293,879

TORCH SUPPORTING AND ADJUSTING APPARATUS

James L. Anderson, Closter, and John H. W. Begerow, Carlstadt, N. J., assignors to Air Reduction Company, Incorporated, New York, N. Y., a corporation of New York Application October 31, 1941, Serial No. 417,226

7 Claims. (Cl. 266—23)

This invention relates to apparatus for supporting a torch from a carriage and for adjusting the position of the torch with respect to the carriage.

The preferred embodiment of the invention comprises a rack bar that extends transversely across a self-propelled torch carriage and supports a torch a short distance beyond the side of the carriage, the bar being adjustable in the direction of its length to change the spacing of the torch from the carriage.

It is an object of the invention to provide an improved torch support of the kind used for connecting a torch with a self-propelled torch carriage, and for adjusting the position of the torch with respect to the carriage. The principal advantages of the invention are simplicity that makes the structure inexpensive to manufacture, and convenience in use, especially in the adjustment of the friction for holding the support in set positions.

In accordance with one feature of the invention a torch holder is connected with a carriage by a rod of generally circular cross-section extending through a bearing in a bracket that is secured to the carriage, and the rod has spaced recesses in one side forming rack teeth, and a novel key structure for preventing the rod from rotating in the bracket. Another feature of the invention relates to the control of the friction of the rod in its bearing by using the key as a brake shoe against the rod.

This application is a continuation-in-part of our copending application Serial No. 256,938, filed February 17, 1939, now Patent #2,266,730.

Other objects, features and advantages of the invention will appear or be pointed out as the specification proceeds.

In the accompanying drawing, forming a part hereof:

Fig. 1 is a side elevation of a torch carriage and a torch connected with the carriage by supporting means embodying the invention.

Fig. 2 is an enlarged, top plan view of a portion of the structure shown in Fig. 1.

Fig. 3 is a front elevation of the structure shown in Fig. 2.

Figs. 4 and 5 are sectional views, taken on the lines 4—4 and 5—5, respectively, of Fig. 2.

Fig. 1 shows a carriage 10 with traction wheels 11 at its forward end and one or more caster wheels 12 at its rearward end. There is a motor 13 in the carriage controlled by a centrifugal governor 14 that can be adjusted by a knob 15 to change the speed at which the motor runs.

The wheels 11 are driven from the motor 13 through reduction gearing, not shown, but well understood in the art.

A post 17 extends vertically upward from a pad 18 secured to the top of the carriage body. A bracket 20, best shown in Fig. 2, has a split clamp 21 at one side. This clamp fits around the post 17 and the opposite sides of the clamp are pulled together, to grip the post 17, by a screw 22. A handle 23 extends through the head of the screw 22. This handle has enlarged ends, and its intermediate portion slides lengthwise in the head of the screw. Such a handle, commonly used on vises, provides a good leverage for turning the clamping screw, but requires very little clearance above the carriage body.

A rod 25, of generally circular cross-section, extends through a cylindrical opening 26 in the bracket 20, and is slidable lengthwise in this opening 26 as a bearing. There are parallel recesses 27 in the forward side of the rod 25 forming rack teeth. A pinion 28 has an axle 29 journaled in the bracket 20 with the teeth of the pinion extending into the cylindrical opening 26 and meshing with the teeth of the rack. A knob 30 pinned on the upper end of the axle 29 is used to turn the pinion and shift the rod 25 lengthwise in the bracket 20.

The rod 25 has a reduced cylindrical end portion at both ends so that a torch holder clamp 32 can be connected to either end of the rod 25. The split end of the clamp 32 that fits over the reduced end of the rod 25 is drawn together by a clamping screw 33 (Fig. 1), and another split end of the clamp 32 is drawn together by a clamping screw 34 to grip a stud 35 extending at right angles to the axis of the rod 25.

The stud 35 is an integral part of a torch holder 36 in which a torch 37 is held. The torch 37 is vertically adjustable in the torch holder 36 by rack and pinion means operated by a hand wheel 38, well understood in the art.

The torch holder 36 is an eccentric load on the rod 25, that is, it tends to rotate the rod 25 about its axis. A key 40 extends into a keyway 41 in the rod 25 to prevent the rod from turning in the bracket 20. The keyway 41 runs lengthwise of the rod 25, and preferably for the full length of the full diameter portion of the rod so as to permit a maximum range of adjustment of the rod 25 lengthwise in the bracket. The position of the parts can, of course, be reversed, the keyway being located in the bracket and the key connected to the rod 25, but such a construction requires a longer key and does not lend itself as well to the friction adjustment feature of this invention.

The key 40 fits freely into the keyway 41 and also fits freely into a recess 43 in the bearing surface of the opening 26. Studs 44 projecting from the back of the key 40 fit into openings in the bracket and prevent displacement of the key 40 lengthwise of the rod 25. The bottom of the keyway 43 limits the displacement of the key toward the axis of the rod 25, and the key is held against the bottom of the keyway by a screw 46 that threads through the back of the bracket 20. The screw 46 is turned one way or the other to adjust the pressure of the key against the bottom of the keyway, and that pressure determines the bearing pressure between the other side of the rod 25 and the side of the opening 26. In a sense, the key 40 is a brake shoe contacting with the rod 25 to provide sufficient friction to hold the rod in any position to which it is adjusted by means of the knob 30.

Changes and modifications can be made in the illustrated embodiment of the invention, and some features can be used without others. Terms of orientation are, of course, relative.

We claim:

1. A torch cutting or welding machine including a carriage for moving a torch along a given course, a bracket connected with the carriage and adjustable on the carriage about a substantially vertical axis, said bracket having a cylindrical opening with a horizontally-extending axis, a shaft journaled in the bracket, a manually-actuated knob for turning the shaft, a pinion secured to the shaft in such position that teeth of the pinion extend into the cylindrical opening through the bracket, a rod of circular cross-section extending through the cylindrical opening and movable in said opening as a bearing, the rod having parallel, spaced recesses in a portion of its cylindrical surface forming rack teeth that mesh with the teeth of the pinion and having a longitudinally extending keyway in another portion of its cylindrical surface, a key in the bracket for engaging the keyway, projections extending from the key into the bracket transversely of the axis of the rod for preventing displacement of the key lengthwise of the rod, and a screw threading through a part of the bracket into contact with the side of the key away from the rod for holding the key against the bottom of the keyway to control the friction between the rod and key.

2. A torch support comprising a bracket for connection with a cutting or welding machine, a rod of circular cross-section that slides in an opening through the bracket as a bearing, and means for preventing the rod from turning and for controlling its friction in the bearing, said means including a key that fits into a longitudinal keyway in the rod, studs projecting from the key transversely of the rod and extending into openings in the bracket for preventing displacement of the key lengthwise of the rod, said studs fitting freely into the openings in the bracket so that the key is movable transversely of the rod, and an element urging the key against the rod to provide a controlled friction resisting longitudinal displacement of the rod in the bracket.

3. Apparatus for supporting a torch from a torch carriage and for adjusting the position of the torch with respect to the torch carriage, said apparatus including a bracket for connection with the carriage, a rod of circular cross-section that slides in an opening in the bracket and to one end of which a torch holder is connected, said rod having parallel grooves in a portion of its cylindrical surface forming teeth of a rack, a pinion supported by the bracket and meshing with the rack, and a key and keyway extending longitudinally of the rod, and one of which is in the rod and the other of which is in the bracket for preventing the rod from turning in the bracket.

4. Apparatus for supporting a torch from a torch carriage and for adjusting the position of the torch with respect to the torch carriage, said apparatus including a bracket for connection with the carriage, a rod of circular cross-section that slides in an opening in the bracket and to one end of which a torch holder is connected, said rod having parallel grooves in a portion of its cylindrical surface forming teeth of a rack, means for shifting the rod longitudinally in the bracket including a pinion journaled in the bracket and a knob for rotating the pinion, means for preventing the rod from turning in the bracket and for controlling the friction of the bearing surface of the rod on the bearing surface in the bracket, said means including a key that extends from one of said bearing surfaces and into a keyway in the other of said bearing surfaces, the key and keyway both extending longitudinally of the rod, and a screw that threads through the bracket and urges surfaces of the keyway and key together to control the friction of the rod in the bracket.

5. Torch supporting and adjusting apparatus including two relatively movable elements, the first for connection with a torch carriage and the second for connection with a torch holder, said first element comprising a bracket and said second element comprising a rod of circular cross-section that slides in an opening through the bracket as a bearing, a key connected with one of said elements and extending longitudinally of the rod and engaging a similarly extending keyway in the other of said elements for preventing the rod from turning in the bracket, and a device that urges surfaces of the key and keyway together to create friction for resisting movement of the rod in the bracket.

6. Apparatus for connecting a torch to a cutting or welding machine, a bracket with a round opening that provides a bearing for a circular rod, a key at one side of the opening for engaging a longitudinally extending keyway in the rod, and a pinion journaled in the bracket with its teeth extending into the opening on another side for engaging rack teeth on the rod.

7. In cutting or welding apparatus, a torch carriage, a torch-arm holder on top of the carriage, a torch arm of generally round cross-section extending through the holder and having rack teeth cut in one side thereof, a keyway running lengthwise of the torch arm, a key on the torch-arm holder, and a screw controlling the friction of the key in the keyway.

JAMES L. ANDERSON.
JOHN H. W. BEGEROW.